(12) United States Patent
Adibhatla et al.

(10) Patent No.: US 7,020,595 B1
(45) Date of Patent: Mar. 28, 2006

(54) METHODS AND APPARATUS FOR MODEL BASED DIAGNOSTICS

(75) Inventors: Sridhar Adibhatla, West Chester, OH (US); Malcolm J. Ashby, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/449,773

(22) Filed: Nov. 26, 1999

(51) Int. Cl.
*G06G 7/48* (2006.01)

(52) U.S. Cl. ............................ 703/7; 700/30; 700/31; 706/52; 714/25; 714/47; 714/745; 703/8; 701/100

(58) Field of Classification Search ................ 703/6, 703/7, 8; 700/28, 29, 30, 31, 32; 714/25, 714/37, 47, 745; 706/20, 52, 47; 701/3, 701/100; 73/118.1
See application file for complete search history.

(56) References Cited

U.S. PATENT DOCUMENTS

| | | | |
|---|---|---|---|
| 4,215,412 A | | 7/1980 | Bernier et al. |
| 5,080,496 A | | 1/1992 | Keim et al. |
| 5,489,829 A | | 2/1996 | Umida |
| 5,689,066 A | | 11/1997 | Stevenson |
| 5,726,891 A | | 3/1998 | Sisson et al. |
| 6,282,884 B1 | * | 9/2001 | Adibhatla et al. ........ 60/39.281 |
| 6,459,963 B1 | * | 10/2002 | Bennett et al. ............... 701/3 |
| 6,463,380 B1 | * | 10/2002 | Ablett et al. ................ 701/100 |
| 6,466,858 B1 | * | 10/2002 | Adibhatla et al. .......... 701/100 |
| 6,502,085 B1 | * | 12/2002 | Adibhatla et al. ............ 706/52 |
| 6,532,412 B1 | * | 3/2003 | Adibhatla et al. .......... 701/100 |
| 6,539,783 B1 | * | 4/2003 | Adibhatla .................. 73/118.1 |
| 6,564,109 B1 | * | 5/2003 | Ashby et al. ................. 700/32 |
| 6,598,195 B1 | * | 7/2003 | Adibhatla et al. ........... 714/745 |

FOREIGN PATENT DOCUMENTS

EP 0 858 017 A2 8/1998

OTHER PUBLICATIONS

Yu et al., T. A Floating Point Co-Processor for Real-Time Fault Detection and Isolation in Electronically Controlled IC engines, Eighth International Conference on Automotive Electronics, Oct. 1991, pp. 53-57.*

(Continued)

*Primary Examiner*—Russell Frejd
(74) *Attorney, Agent, or Firm*—William Scott Andes; Armstrong Teasdale LLP

(57) ABSTRACT

Systems and methods for performing module-based diagnostics are described. In an exemplary embodiment, sensor values from an actual engine plant are input to an engine component quality estimator which generates performance estimates of major rotating components. Estimated performance differences are generating by comparing the generated performance estimates to a nominal quality engine. The estimated performance differences, which are indicative of component quality, are continuously updated and input to a real-time model of the engine. The model receives operating conditional data and the quality estimates are used to adjust the nominal values in the model to more closely match the model values to the actual plant. Outputs from the engine model are virtual parameters, such as stall margins, specific fuel consumption, and fan/compressor/turbine efficiencies. The virtual parameters are combined with the sensor values from the actual engine plant in a fault detection and isolation classifier to identify abnormal conditions and/or specific fault classes, and output a diagnosis.

16 Claims, 4 Drawing Sheets

OTHER PUBLICATIONS

Nordgren et al., R.E. Robust Multivariable Turbofan Engine Control: A Case Study, Proceedings of the 33rd IEEE Conference on Decision and Control, Dec. 1994, vol. 2, pp. 1086-1097.*

Mast et al., T.A. Bayesian Belief Networks for Fault Identification in Aircraft Gas Turbine Engines, Proceedings of the 1999 IEEE International Conference on Control Applications, vol. 1, Aug. 1999, pp. 39-44.*

Asik et al., J.R. A/F Ratio Estimation and Control Based on Induced Engine Roughness, Control Systems Magazine, IEEE, vol. 16, Iss. 6, Dec. 1996, pp. 35-42.*

Piercy, N.P. Sensor Failure Estimators for Detection Filters, IEEE Transactions on Automatic Control. vol. 37, Iss. 10, Oct. 1992, pp. 1553-1558.*

Maggiore et al., M. Estimator Design in Jet Engine Applications, Proceedings of the 38th IEEE Conference on Decision and Control, vol. 4, Dec. 1999, pp. 3938-3943.*

Frederick et al., D.K. Turbofan Engine on Control Design Using Robust Multivariable Control Technologies, IEEE Transactions on Control Systems Technologies, vol. 8, Iss. 6, Nov. 2000, pp. 961-970.*

* cited by examiner

METHODS AND APPARATUS FOR MODEL BASED DIAGNOSTICS

The Government has rights in this invention pursuant to Contract No. MDA972-98-3-0002 awarded by the Defense Advanced Research Projects Agency.

BACKGROUND OF THE INVENTION

The present invention relates generally to gas turbine engines, and more specifically, to diagnosing faults in such engines.

Gas turbine engines are used in aeronautical, marine, and industrial applications. In the aeronautical application, gas path or performance related faults are typically detected using flight-to-flight trending. Changes in sensed parameters are identified between a current flight and a previous flight. If multiple parameters are trended, then the pattern in the changes may be sufficiently distinct to allow classification (i.e., diagnosis) as a specific fault. With flight-to-flight trending, data scatter may occur, and such data scatter may be of a same order of magnitude as the fault effects to be identified.

BRIEF SUMMARY OF THE INVENTION

Systems and methods for performing model-based diagnostics are described. In an exemplary embodiment, sensor values from an actual engine plant are input to an engine component quality estimator which uses regression techniques to generate performance estimates of major rotating components, e.g. efficiency and airflow of a fan, compressor and turbines. Estimated performance differences are generating by comparing the generated performance estimates to a nominal quality engine. The estimated performance differences, which are indicative of component quality, are continuously updated and input to a real-time model of the engine. The model receives operating conditional data and the quality estimates are used to adjust the nominal values in the model to more closely match the model values to the actual plant. Outputs from the engine model are virtual parameters, such as stall margins, specific fuel consumption, and fan/compressor/turbine efficiencies. The virtual parameters are combined with the sensor values from the actual engine plant in a fault detection and isolation classifier, such as a linear regressor or a neural network, to identify abnormal conditions and/or specific fault classes, and output a diagnosis.

DETAILED DESCRIPTION OF THE INVENTION

Figure 1:
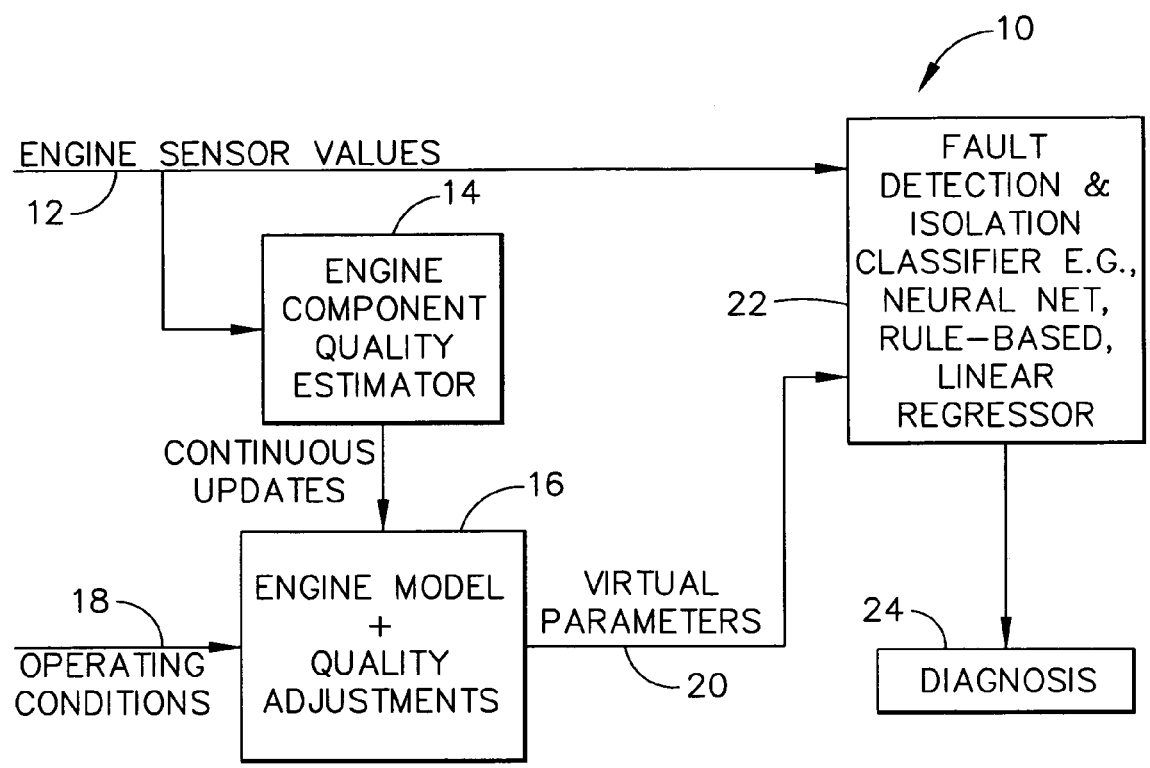
FIG. 1 illustrates an absolute value-model based diagnostic system.

An exemplary embodiment of a system 10 for performing model-based diagnostics is illustrated in FIG. 1. More specifically, and referring to FIG. 1, sensor values 12 from an actual engine plant are input to an engine component quality estimator 14. Estimator 14 uses regression or other system identification techniques to produce performance estimates of major rotating components, e.g. efficiency and airflow of a fan, compressor and turbines. Estimated performance differences are generating by comparing the generated performance estimates to a nominal quality engine. The estimated performance differences, which are indicative of component quality, are continuously updated and input to a real-time model 16 of the engine. Model 16 receives operating conditional data 18 and the quality estimates are used to adjust the nominal values in model 16 to more closely match the model values to the actual plant. Outputs from engine model 16 are virtual parameters 20, such as stall margins, specific fuel consumption, and fan/compressor/turbine efficiencies. Virtual parameters 20 are combined with sensor values 12 from the actual engine plant in a fault detection and isolation classifier 22, such as a linear regressor or a neural network, to identify abnormal conditions and/or specific fault classes and output a diagnosis 24.

In a specific embodiment of engine component quality estimator 14, input vector x, representative of measured and modeled values of rotor speeds, temperatures, and pressures, is normalized and multiplied by a regressor matrix R, to obtain a vector of normalized component quality estimates $\hat{y}$ (e.g., changes in efficiency and flow modifiers for the fan, booster, compressor, high pressure turbine, and low pressure turbine):

$$\hat{y} = \hat{x}R$$

where, $$\hat{x} = (x - \bar{x})/x_s$$

$$\hat{y} = (y - \bar{y})/y_s$$

where, $\bar{x}$ and $\bar{y}$ are mean values of $x$ and $y$, respectively $x_s$ and $y_s$ are scale factors for $x$ and $y$, respectively The regressor matrix R is generated by a 'training' process. In the training process, a large number of engines of specified and/or random component quality are simulated, and the resulting sensor values are obtained. In addition, a nominal engine or 'model' is run at the same operating conditions (altitude, mach number, total inlet temperature, power-setting parameter such as fan speed, and bleed setting, for example) as the engine simulation. The number of engines simulated is n, the number of component quality parameters is p, the number of engine sensor values is a, and the number of nominal engine sensor or 'model' values is b. Then, a multiple linear regression solution provides the regressor matrix R using:

$$R = \hat{X} \backslash \hat{Y}$$

where $\hat{X}$ and $\hat{Y}$ are normalized values of X and Y obtained by the use of mean values and scale factors just like x and y above and, X is an (a+b) by n matrix of sensor and model values Y is a p by n matrix of simulated component quality variations \ is the pseudo-inverse operator denoting a least-squares solution to $$Y = XR$$

In a typical implementation, data is collected at a single operating condition, or even a multiplicity of operating conditions or even operating regimes (such as takeoff, climb, and cruise). In another embodiment, estimator is a nonlinear estimator such as a neural network, rather than a linear regressor.

The linear regressor described above is a one-time or "snapshot" approach for estimating component health. For a continuous update, the regressor is replaced by a proportional plus integral (PI) regulator. Nominally, the proportional and integral gain matrices are set equal to the regressor matrix. However, these matrices can be modified, for instance by multiplying by a constant that can be tuned, to modify regulator performance.

Model 16 of the plant, or engine, is used to estimate sensed parameters such as rotor speeds, temperatures, and pressures, given environmental conditions, power setting parameters, and actuator positions as input. Model 16 is, for example, a physics-based model, a regression fit, or a neural-net model of the engine. In an exemplary embodiment, model 16 is a physics-based aerothermodynamic model of the engine. This type model is referred to as a Component Level Model (CLM) because each major component in the engine (e.g., fan, compressor, combustor, turbines, ducts, and nozzle) is individually modeled, and then the components are assembled into the CLM.

Figure 2:
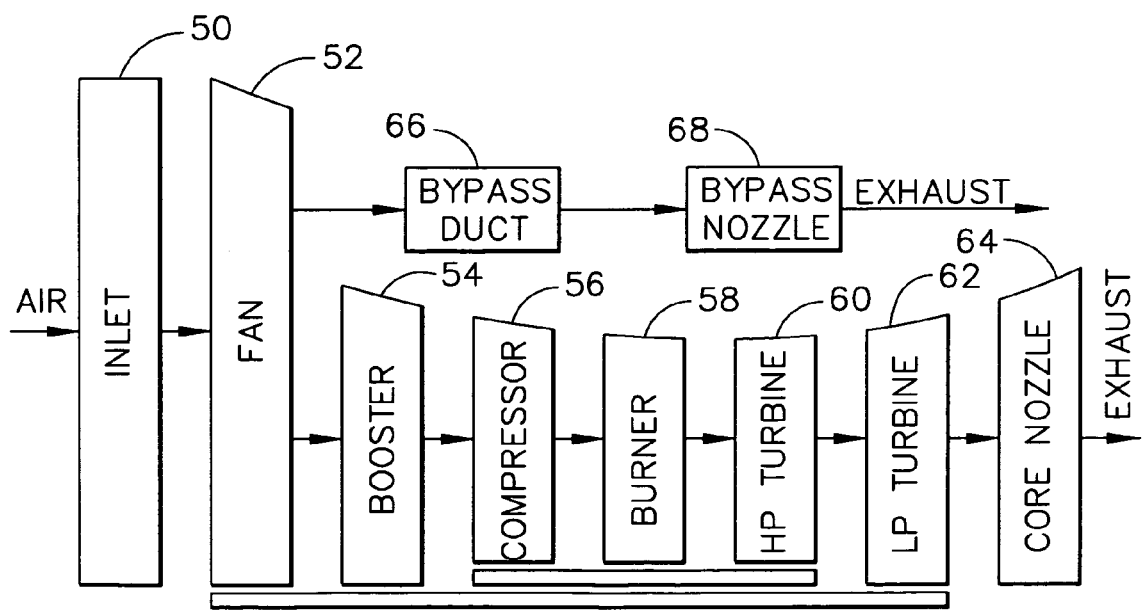
FIG. 2 illustrates a physics based nonlinear model of a turbofan engine.

FIG. 2 illustrates components of engine model 16. As shown in FIG. 2, model 16 includes an air inlet 50 and a fan 52 downstream from inlet 50. Model 16 also includes, in series flow relationship, a booster 54, a compressor 56, a burner 58, and a high pressure turbine 60, and a low pressure turbine 62. Exhaust flows from a core nozzle 64, which is downstream from low pressure turbine 62. Air also is supplied from fan 52 to a bypass duct 66 and to a bypass nozzle 68. Exhaust flows from bypass nozzle 68.

The CLM is a fast running transient engine cycle representation, with realistic sensitivities to flight conditions, control variable inputs and high-pressure compressor bleed. The CLM is tuned to match actual engine test data both for steady-state and transient operation.

Figure 3:
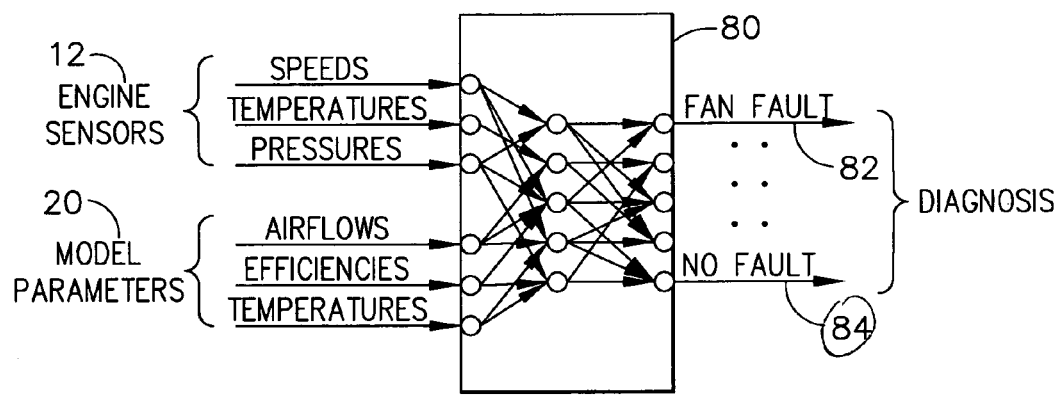
FIG. 3 illustrates a neural network fault detection and isolation classifier.

A specific embodiment of fault detection and isolation classifier 22 is illustrated in FIG. 3. Engine sensor values 12 and model parameters 20 are input to a feed-forward neural network 80. Outputs from neural network 80 include indicators for fault paths 82 appropriate to each engine rotating component as well as a no-fault path 84. Network 80 is trained on large sets of engine/model data that includes effects of engine quality, deterioration, sensor bias, and operating conditions. These data sets include predominantly unfaulted data as well as representative sets of engine/model data for each fault to be classified.

Figure 4:
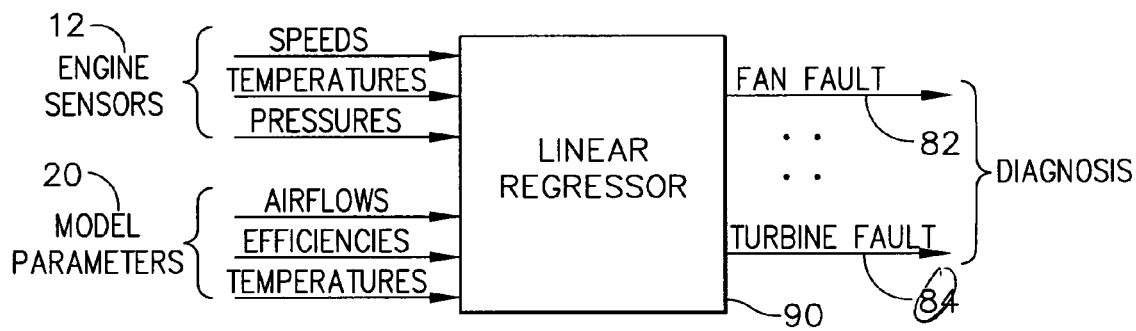
FIG. 4 illustrates a linear regressor fault detection and isolation classifier.

An alternate embodiment of fault detection and isolation classifier 22 is illustrated in FIG. 4. Engine sensor values 12 and model parameters 20 are input to a linear regressor 90. Regressor 90 is similar to the regressor described above, except that the 'training' data includes simulated unfaulted engines as well as simulated engines with specific faults of varying magnitudes.

System 10 described above provides the advantage that it does not rely on prior knowledge or collection of data from a prior operating condition. System 10 therefore is suited for diagnosing pre-existing faults, i.e. faults that are present when the engine is initially started. An example of a pre-existing fault is a variable stator vane misrigging.

Figure 5:
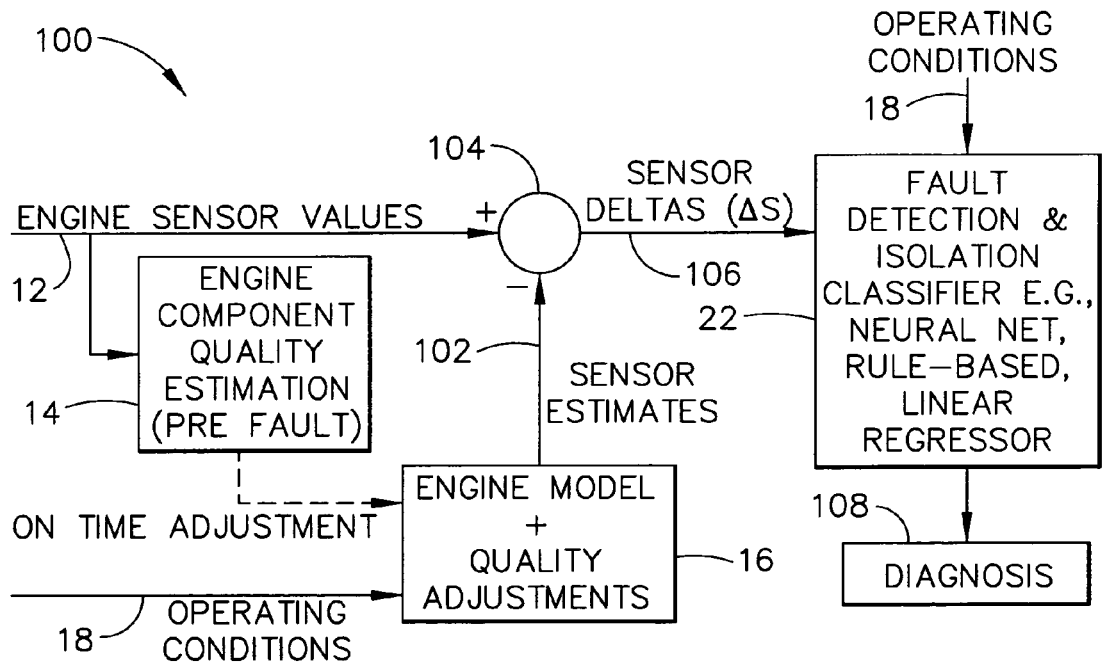
FIG. 5 illustrates a sensor delta-model based diagnostics system.

FIG. 5 illustrates a sensor delta-model based diagnostics system 100. Components/processing in system 100 identical to components/processing in system 10 are identified in FIG. 5 using the same reference numerals as used in FIG. 1. Referring now specifically to FIG. 5, sensor values 12 from the actual engine plant are input to component quality estimator 14. Estimator uses regression or system identification techniques to produce performance estimates of the major rotating components, e.g. efficiency and airflow of the fan, compressor and turbines, which are relative to a nominal quality engine. These estimated performance differences, which are indicative of the quality of these components, are input one time, typically at the beginning of a flight to a real-time model 16 of the engine.

Model 16 receives the same operating conditional data 18 as the actual engine plant, and the quality estimates are used to adjust the nominal values in model 16 in order to more closely match those of the actual plant. It is assumed at this time that the actual engine plant is unfaulted. Outputs from engine model 16 are estimates of the engine sensors 102. Computed sensor values 102 are deducted 104 from the actual engine sensor values 12 to produce sensor deltas 106. Deltas 106 should normally be close to zero for a no-fault condition. When a fault occurs the actual engine sensor values 12 will change, but the model computed sensors 102 will not. As a result, the values of the sensor deltas 106 will change. Sensor deltas 106, together with the engine operating conditions 18, are then input to fault detection and isolation classifier 22 such as a neural network or linear regressor, to identify abnormal conditions and/or specific fault classes and output a diagnosis 108.

System 100 provides the advantage that model 16 is adjusted to account for sensor bias effects and engine component quality. An accurate quality estimation from estimator 14 is needed in order to determine the sensor deltas 106.

Figure 6:
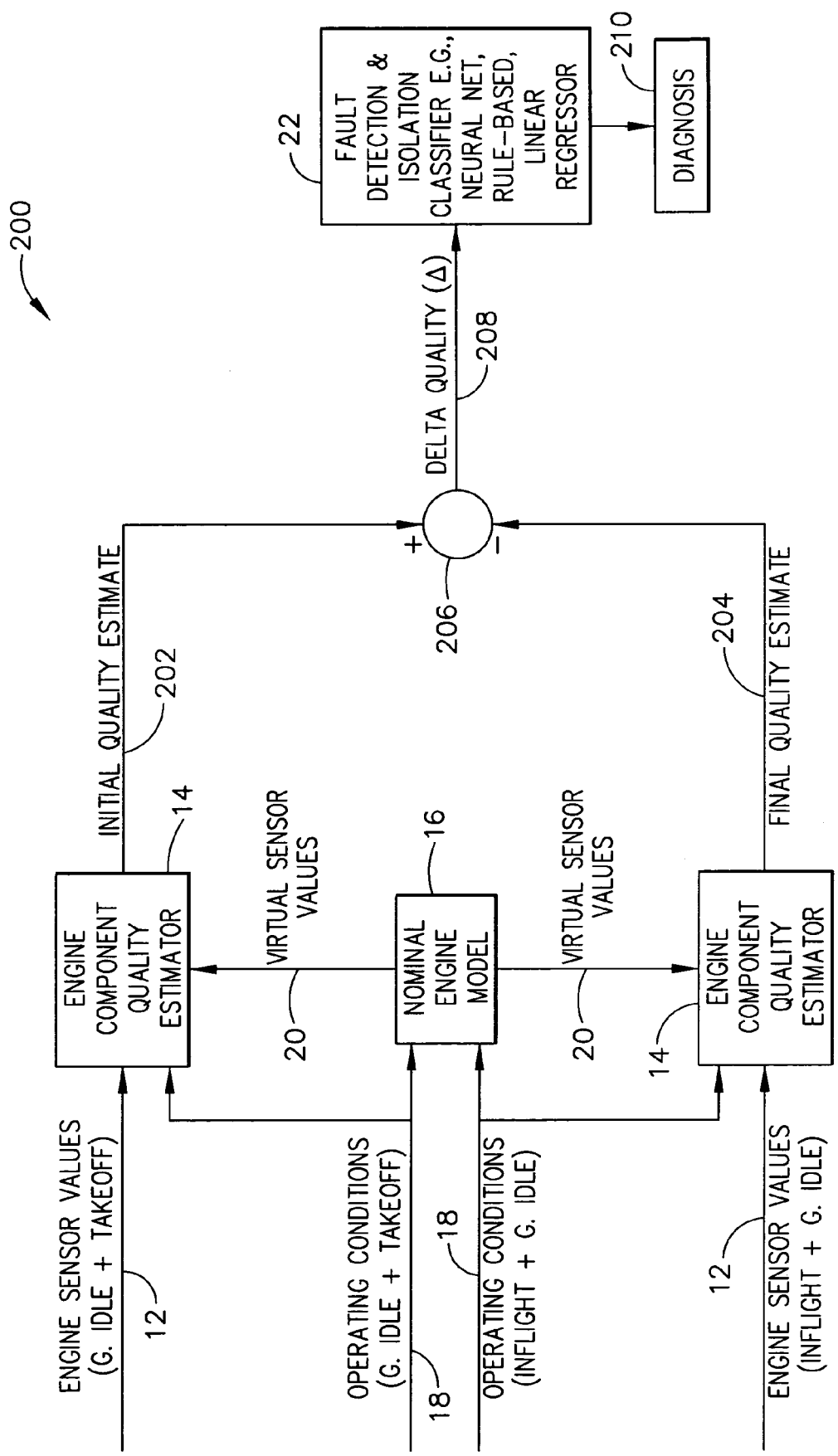
FIG. 6 illustrates a components quality delta-model based diagnostics system.

FIG. 6 illustrates an estimated quality deltas model-based diagnostic system 200. Components/processing in system 200 which are identical to components/processing in system 10 are identified in FIG. 6 using the same reference numerals as used in FIG. 1. Referring now specifically to FIG. 6, sensor values 12 from the actual engine plant together with estimated sensor values 20 from model 16 of a nominal (new, unfaulted) engine are input to a component quality estimator 14. Sensor and model values from a multiplicity of operating condition are used. In this embodiment, data 18 from two engine operating conditions, e.g., pre-flight ground idle and takeoff, are utilized in component quality estimator 14 to produce an initial (pre-flight) quality estimate 202 of the major rotating components, e.g. efficiency and airflow of the fan, compressor and turbines. This process is repeated at the end of the flight by using inflight data such as the last high power data set (before descent) and post-flight ground idle 18 from the engine sensors 12 and the associated model computed sensor data 20. The resulting output from the component quality estimator 14 produces a final (post-flight) quality estimate 204. Component quality estimator 14 is the same estimator as used pre-flight except the gains used in post-flight are modified due to the difference in operating conditions at which the data is collected.

A difference 206 between final quality estimate 204 and initial quality estimate 202 is determined. A delta change in quality 208 is then be assessed in fault detection and isolation classifier 22, such as a neural network or linear regressor, to identify abnormal conditions and/or specific fault classes and output a diagnosis 210.

System 200 directly identifies engine quality changes, which facilitates significantly reducing the complexity of diagnostic classification assessment. The absolute values of the individual quality estimates need not be accurate, only consistent, since the resulting delta quality (i.e., quality value 208) is indicative of the fault effects.

Figure 7:
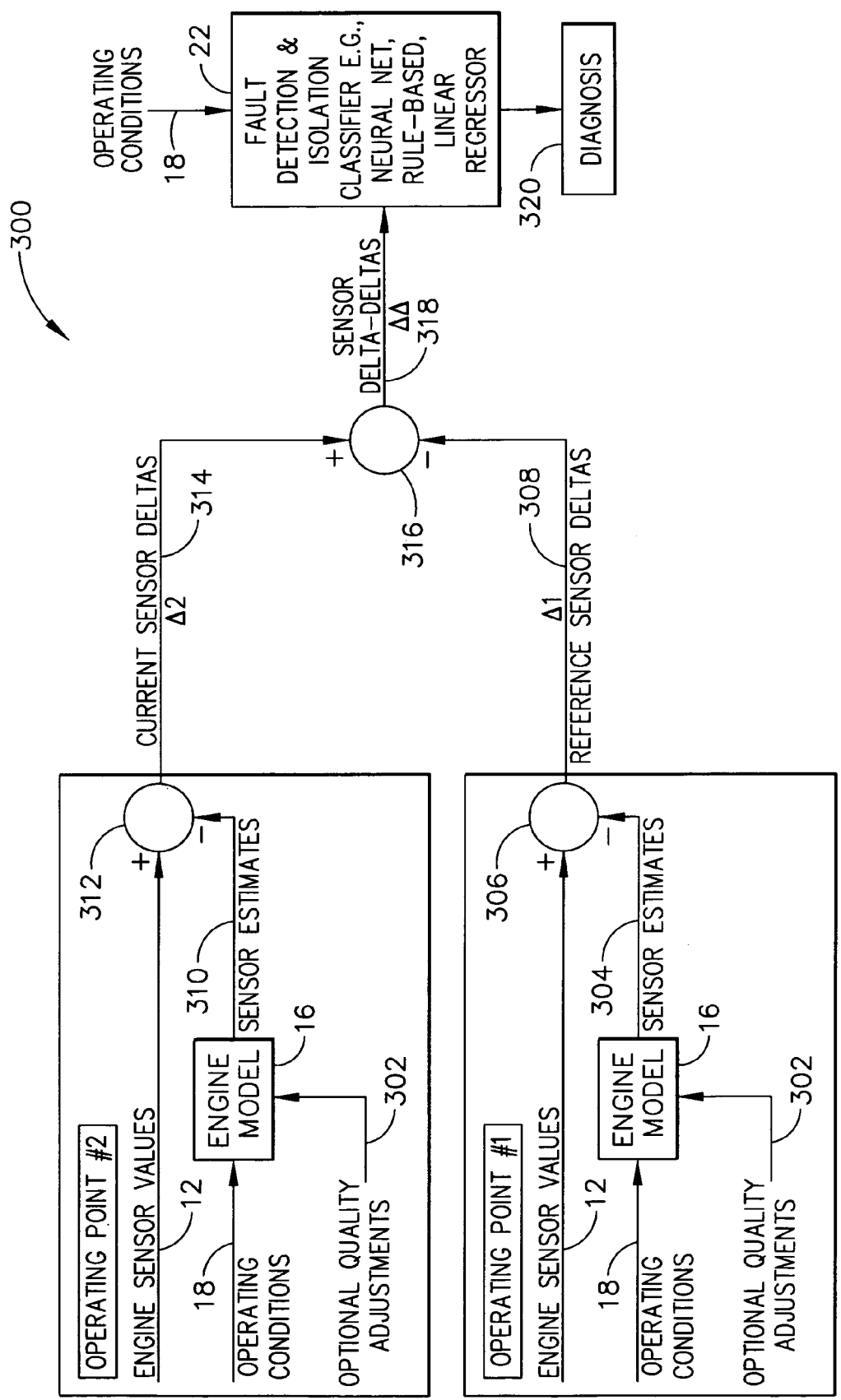
FIG. 7 illustrates a sensor delta—delta-model based diagnostics system.

FIG. 7 illustrates a sensor delta-delta model-based diagnostic system 300. Components/processing in system 300 which are identical to components/processing in system 10 are identified in FIG. 7 using the same reference numerals as used in FIG. 1. Referring now specifically to FIG. 7, a real-time engine model 16 is run to the same operating conditions 18 as the actual engine plant. Model 16 represents a nominal unfaulted engine, or optionally it could be updated at the beginning of a flight with quality adjustments 302 from a component quality estimator. The outputs from real-time engine model 16 are estimates of engine sensors 304. These estimates are compared (e.g., subtracted) 306 with actual sensor values 12 from the engine plant and deltas (e.g., delta 1 and delta 2) are determined. The engine plant is assumed to be unfaulted and the deltas can therefore be considered as a reference (normal) set 308.

During flight, as engine operating conditions 18 change, new estimated sensor values 310 are computed by real-time engine model 16. The associated actual engine sensor values 12 can then be compared 312 with estimates 310 to compute new (current) deltas 314. If the engine is still unfaulted, current deltas 314 will be similar to initial reference deltas 308 and a change 316 in deltas, or delta-deltas 318, will be close to zero. When a fault occurs current deltas 314, a change relative to the reference deltas 316 produces non-zero delta-deltas 318. Delta-deltas 318 can then be input together with engine operating conditions 18 to fault detection and isolation classifier 22, such as a neural network or linear regressor, to identify abnormal conditions and/or specific fault classes and output a diagnosis 320. Engine operating conditions 18 are utilized in the classifier since the effect of engine faults may not constant throughout the flight envelope.

System 300 improves upon system 100 in that in system 300, residual effects of sensor bias and component quality that are not accounted for by the model adjustments in system 100 are be negated by the delta—delta determination in system 300.

While the invention has been described in terms of various specific embodiments, those skilled in the art will recognize that the invention can be practiced with modification within the spirit and scope of the claims.

What is claimed is:

1. A system for monitoring engine performance, said system comprising:
    an engine model;
    a component quality estimator coupled to said engine model; and
    a fault detection and isolation classifier coupled to said engine model and to said component quality estimator, said engine component quality estimator generates performance estimates, said model generates virtual parameters based on the performance estimates and engine operating conditions.

2. A system in accordance with claim 1 wherein said model comprises a component level model of an engine.

3. A system in accordance with claim 1 wherein said component quality estimator comprises a linear regressor.

4. A system in accordance with claim 1 wherein said fault detection and isolation classifier comprises a feed-forward neural network.

5. A system in accordance with claim 1 wherein said fault detection and isolation classifier comprises a linear regressor.

6. A system in accordance with claim 1 wherein said fault detection and isolation classifier identifies fault conditions based on said virtual parameters and engine sensor values.

7. A system in accordance with claim 1 wherein said engine virtual parameters are subtracted from engine sensor values to generate sensor deltas supplied to said fault detection and isolation classifier.

8. A system in accordance with claim 7 wherein reference sensor deltas are generated and are compared to later obtained sensor deltas to generate sensor delta-deltas supplied to said fault detection and isolation classifier.

9. A system in accordance with claim 1 wherein said model 5 generates virtual sensor values based on engine operating conditions, and said component quality estimator generates quality estimates based on said virtual sensor values and engine sensor values.

10. A system in accordance with claim 9 wherein said engine component quality estimator generates an initial quality estimate and a final quality estimates, and the initial and final quality estimates are compared to generate a delta quality supplied to said fault detection and isolation classifier.

11. A method for monitoring engine performance, said method comprising the steps of:
    supplying engine operating conditions to an engine model;
    supplying engine sensor values to an engine component quality estimator;
    generating a fault detection based at least in part on engine model outputs, and at least in part on estimator outputs; and
    supplying the estimator outputs to the engine model.

12. A method in accordance with claim 11 wherein the engine model generates sensor estimates, and said method further comprises the step of generating sensor deltas by comparing the sensor estimates to engine sensor values.

13. A method in accordance with claim 11 further comprising the step of supplying the engine model outputs to the component quality estimator.

14. A method in accordance with claim 13 further comprising the steps of:
    operating the engine component quality estimator to generate an initial quality estimate and a final quality estimate; and
    comparing the initial quality estimate to the final quality estimate to generate a delta quality.

15. A method in accordance with claim 11 wherein the engine model generates sensor estimates, and said method further comprises the steps of:
    generating a reference sensor delta by comparing the sensor estimates at a first operating point;
    generating a current sensor delta at a second operating point; and
    generating a sensor delta—delta by comparing the reference sensor delta to the current sensor delta.

16. A method for monitoring engine performance, said method comprising the steps of:
    generating a reference sensor delta by comparing sensor values with sensor estimates at a first operating point;
    generating a current sensor delta at a second operating point;
    generating a sensor delta—delta by comparing the reference sensor delta to the current sensor delta; and
    generating a fault detection based upon the sensor delta-deltas.

* * * * *

UNITED STATES PATENT AND TRADEMARK OFFICE
CERTIFICATE OF CORRECTION

| | | |
|---|---|---|
| PATENT NO. | : 7,020,595 B1 | Page 1 of 1 |
| APPLICATION NO. | : 09/449773 | |
| DATED | : March 28, 2006 | |
| INVENTOR(S) | : Adibhatla et al. | |

It is certified that error appears in the above-identified patent and that said Letters Patent is hereby corrected as shown below:

In Claim 13, column 6, beginning on line 38, between "the" and "component" insert -- engine --.
In Claim 15, column 6, line 54, delete "delta--delta" and insert therefor -- delta-delta--.
In Claim 16, column 6, line 62, delete "delta--delta" and insert therefor -- delta-delta--.

Signed and Sealed this

Eleventh Day of December, 2007

JON W. DUDAS
*Director of the United States Patent and Trademark Office*